(No Model.)  5 Sheets—Sheet 1.
E. T. GILBERT.
NUT TAPPING MACHINE.

No. 507,802. Patented Oct. 31, 1893.

Witnesses
John Schuman
C. B. Bienzigro

Inventor
Edward Thomas Gilbert
By Attorney
Newell S. Wright (No Model.) 5 Sheets—Sheet 2.

E. T. GILBERT.
NUT TAPPING MACHINE.

No. 507,802. Patented Oct. 31, 1893.

Witnesses
John Schuman.
O. B. Baenziger.

Inventor
Edward Thomas Gilbert

By Attorney
Newell S. Wright.

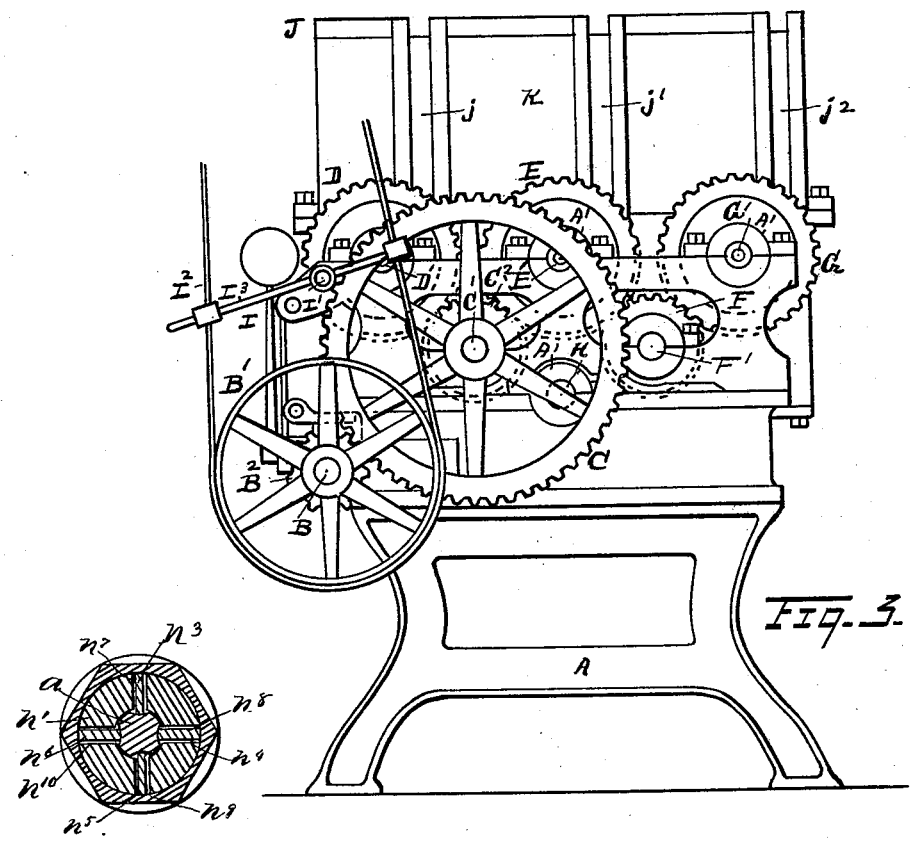

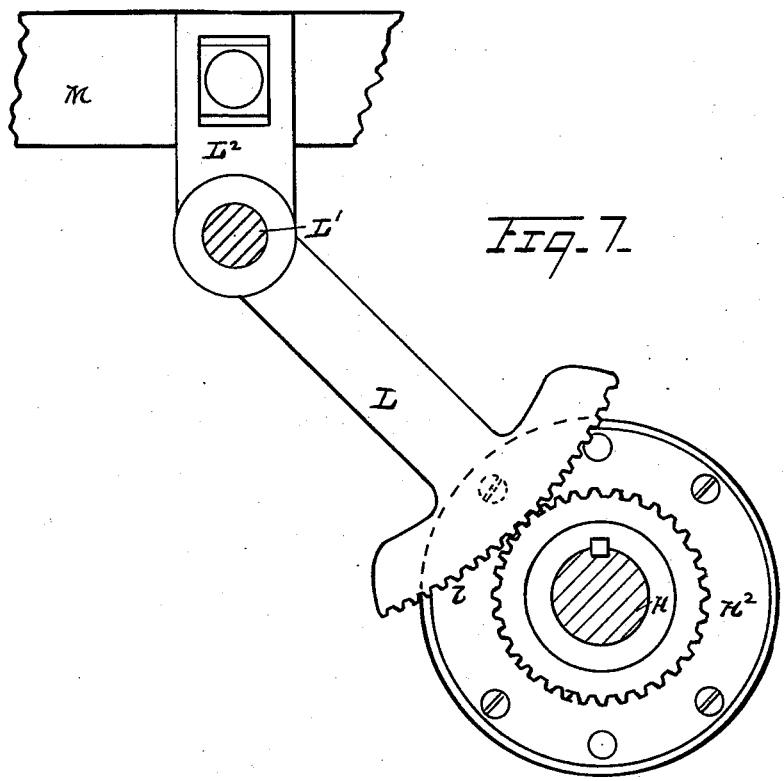
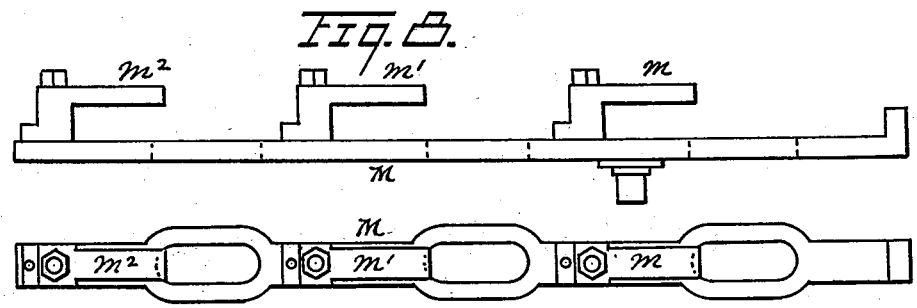
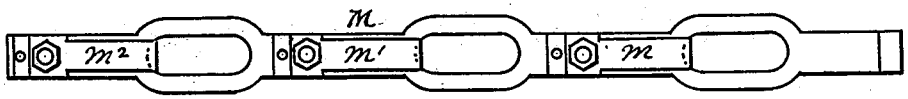

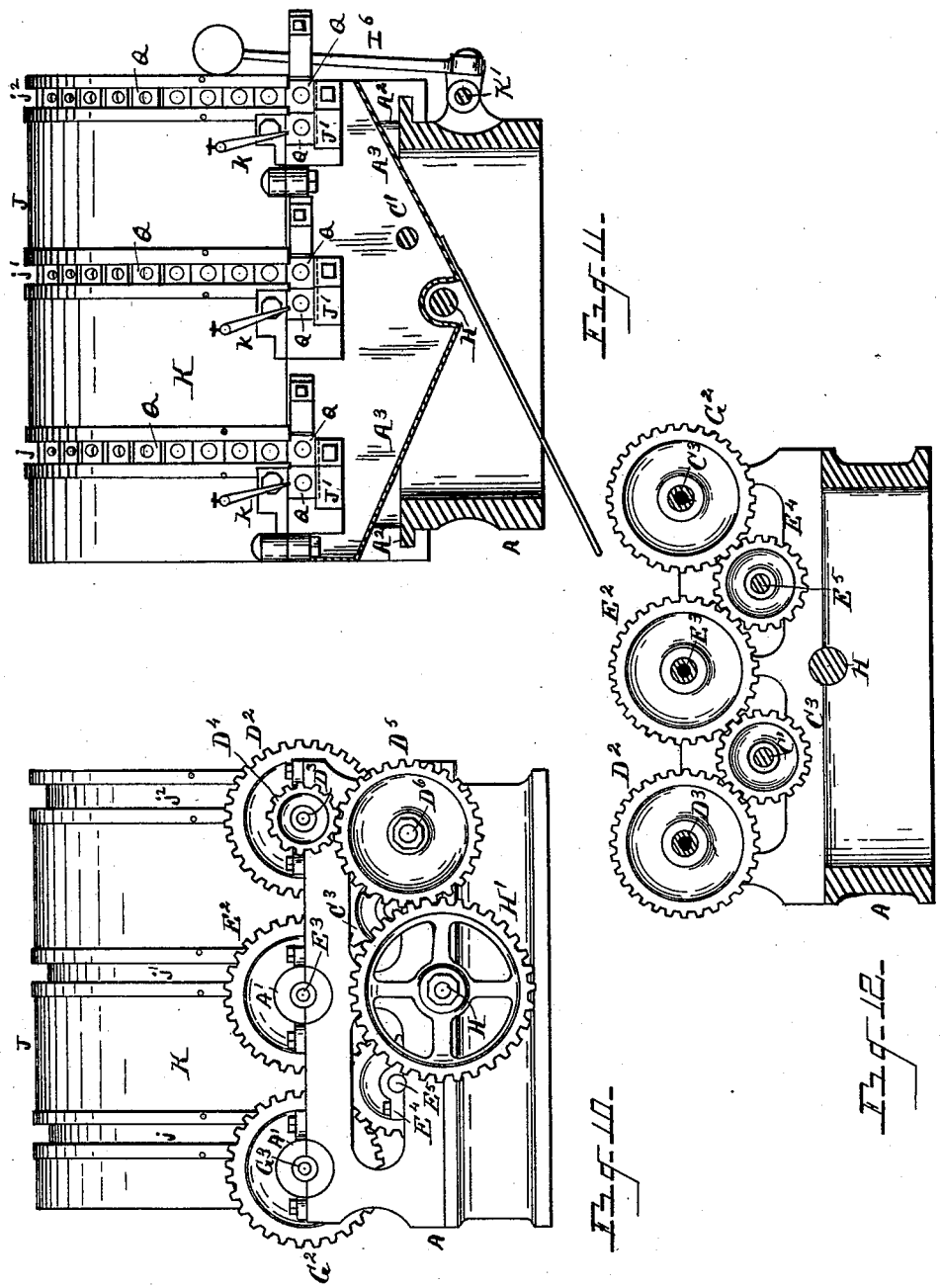

UNITED STATES PATENT OFFICE.

EDWARD THOMAS GILBERT, OF DETROIT, MICHIGAN.

NUT-TAPPING MACHINE.

SPECIFICATION forming part of Letters Patent No. 507,802, dated October 31, 1893.

Application filed July 22, 1893. Serial No. 481,172. (No model.)

*To all whom it may concern:*

Be it known that I, EDWARD THOMAS GILBERT, a citizen of the United States, residing at Detroit, county of Wayne, State of Michigan, have invented a certain new and useful Improvement in Nut-Tapping Machines; and I declare the following to be a full, clear, and exact description of the invention, such as will enable others skilled in the art to which it appertains to make and use the same, reference being had to the accompanying drawings, which form a part of this specification.

My invention relates to an improved nut tapping machine and has for its objects: First. A machine of this character whereby a series of nuts may be simultaneously tapped, and, second, whereby a second series of nuts may also be simultaneously tapped, the two series of nuts being tapped alternately. Third. An important object of my invention, to this end, is to utilize the advance movement of certain portions of the mechanism to tap one set or series of nuts, and to utilize the retraction of said mechanism or its movement in the opposite direction, to tap the second set or series of nuts, thus improving both the forward and retracting movements of said portions of the mechanism to do the work; and, fourth, by such improvements to utilize the power and time required to operate the machine to the fullest possible extent, thereby greatly facilitating and economizing the operation of tapping the nuts. Fifth. My invention contemplates, moreover, a novel construction of the chucks to hold the taps, as well as of the construction of the taps themselves; also, sixth, a novel construction and operation of the shovers, and, seventh, a novel arrangement and operation of the feeding mechanism, whereby the nuts to be tapped are brought into position for being tapped. Eighth. My invention also contemplates the general construction, arrangement and combination of devices and appliances as more fully hereinafter specified and claimed, and illustrated in the accompanying drawings, in which—

Figure 1:
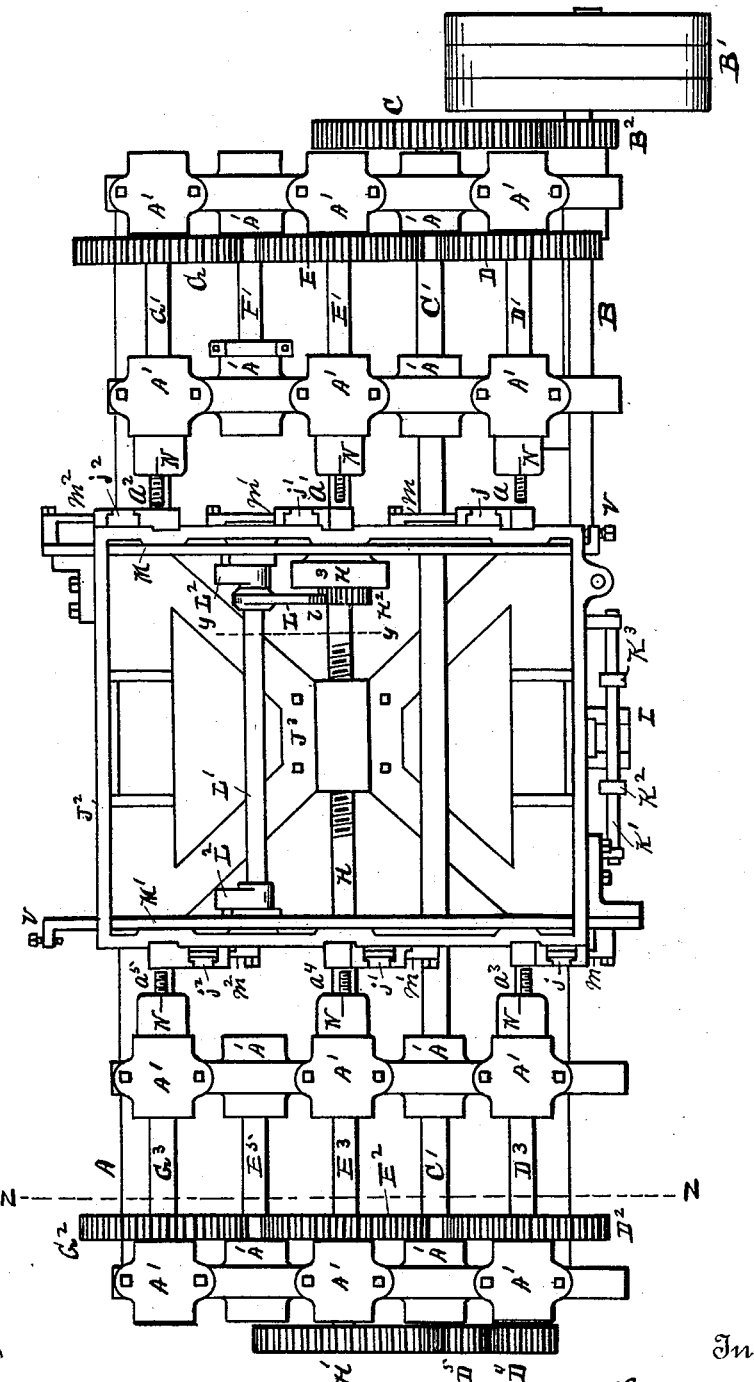
Figure 2:
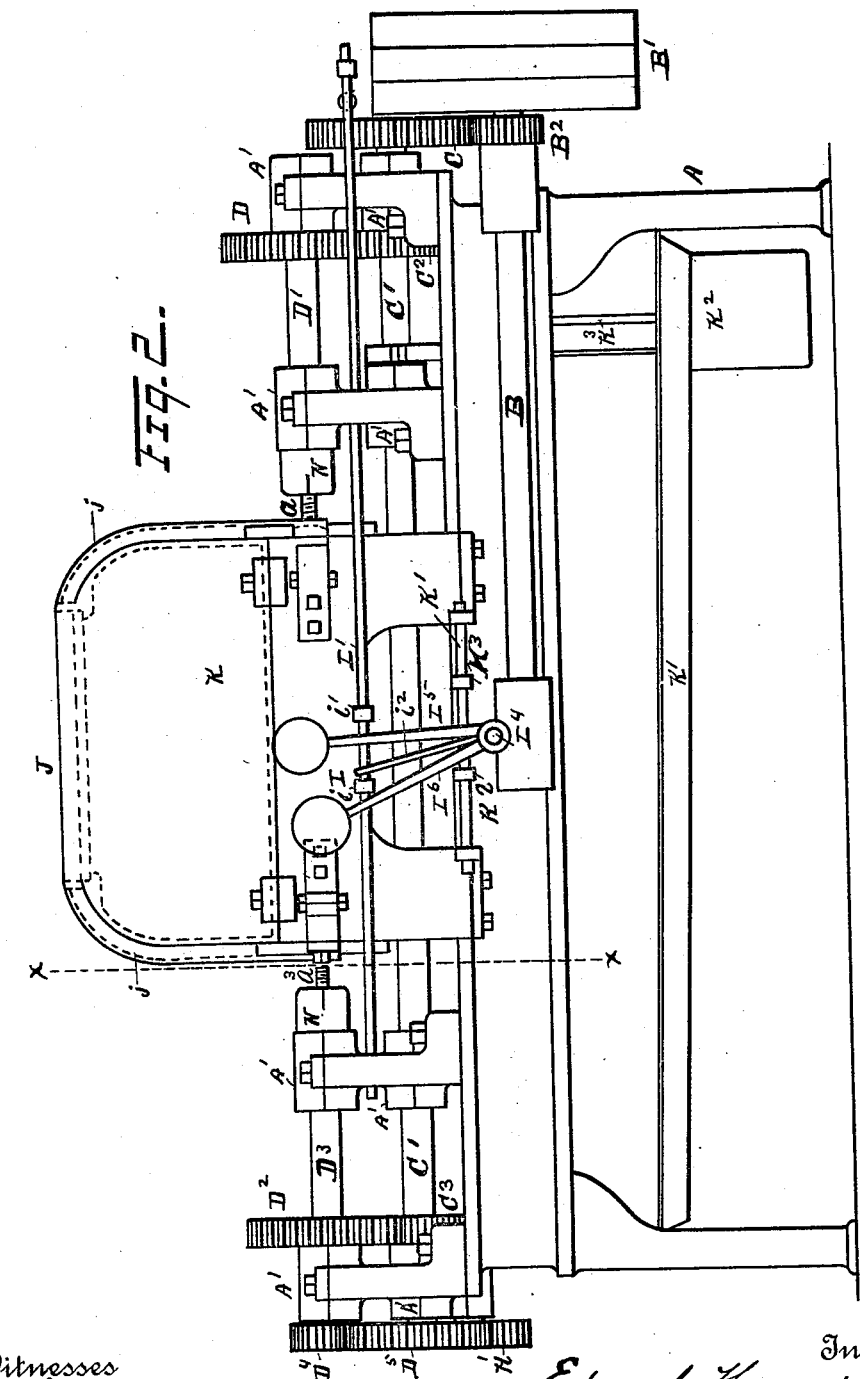

Figure 1 is a plan view embodying my invention, with the oil tank and table removed. Fig. 2 is a side elevation of the same. Fig. 3 is an end elevation. Fig. 4 is a longitudinal section of one of the spindles and its chuck, whereby the taps are held in place and operated. Fig. 5 is a side elevation of the same. Fig. 6 is a cross section of the same, on the line 4—4, Fig. 4. Fig. 7 is a section on the line y—y, Fig. 1. Fig. 8 is a detail view in plan of one of the shover bars and its shover arms. Fig. 9 is a detail view of the same in side elevation. Fig. 10 is an end elevation opposite that shown in Fig. 3. Fig. 11 is a vertical cross section on the line x—x, Fig. 2, looking toward the table. Fig. 12 is a vertical cross section on the line z—z, Fig. 1, looking toward the adjacent gears.

I carry out my invention as follows:

In the drawings A represents any suitable supporting frame.

B denotes the main driving shaft provided with the usual pulleys, shown at B'. The driving shaft is provided with a pinion $B^2$, meshing with a gear C upon a shaft C' running from end to end of the machine. This shaft is provided toward each end with pinions $C^2$ and $C^3$. The pinion $C^2$ meshes with gears D and E, mounted upon spindles D' and E', respectively, said spindles operating corresponding taps. The gear E meshes also with a pinion F mounted upon a shaft F', said pinion F in turn driving a gear G upon a spindle G' operating a corresponding tap. The pinion $C^3$ on the shaft C' meshes with gears $D^2$ and $E^2$ mounted upon spindles $D^3$ and $E^3$, operating corresponding taps. The gear $E^2$ also meshes with a gear $E^4$ on a spindle $E^5$, said gear $E^4$ meshing with a gear $G^2$ upon a spindle $G^3$ operating a corresponding tap.

A' denotes the boxes of the several shafts and spindles.

I do not, however, limit myself to this specific mechanism for driving the tap spindles and other mechanism.

One series of taps operated by the spindles D', E' and G' is represented at "$a$," "$a'$," and "$a^2$," while the other series of taps, operated by the spindles $D^3$, $E^3$ and $G^3$, is represented at "$a^3$," "$a^4$" and "$a^5$."

H is a feed screw shaft. To drive the feed screw, the spindle $D^3$ is provided with a pinion $D^4$, meshing with a gear $D^5$ upon a spindle $D^6$, meshing with a gear H' upon the feed screw shaft.

I is any suitable belt shifter to reverse the motion.

J denotes a table longitudinally movable upon the frame A upon which the nuts are placed, the nuts descending to position to be tapped through corresponding chutes "$j$," "$j'$" and "$j^2$" on either side of said table, said table being operated by the feed screw back and forth as the belt is shifted. The base of the table J is supported upon a suitable track $A^2$ on each side of the frame A, whereby it may be moved toward either end of the machine, alternately, as the driving gear is reversed in its operation by the belt shifter.

K is an oil tank provided with a series of spigots "$k$" to feed oil to the work.

K' is an oil pan beneath the work. $K^2$ is an oil well receiving the oil from said pan, and $K^3$ is an oil pipe through which oil is pumped in any suitable manner back to the tank K.

L denotes an oscillatory lever, provided with a segemental gear "$l$" at its outer end, meshing with a pinion $H^2$ upon the feed screw H, by which said lever is operated. The lever is fulcrumed upon a shaft L'.

M and M' denote shover bars engaged with the shaft L', preferably by an intervening arm $L^2$ engaged with the shaft and having, preferably, an adjustable engagement with the corresponding shover bar. The shover bars M and M' are so arranged with reference to the shaft L' as to be alternately operated in opposite directions as the motion of the feed screw is reversed. These shover bars are each provided with shover arms "$m$," "$m'$," "$m^2$" corresponding to the number of chutes to feed the nuts Q to the work. At the base of each of the chutes in which the nuts descend to be tapped, is a laterally projected track or way J' constructed to permit the lower nut in each of the chutes being shoved laterally by the corresponding movement of the shover arms, so as to bring the nuts into position before the corresponding taps. Then as the table is advanced toward the corresponding set of taps the nuts thus moved out laterally upon said tracks are tapped. The advancement of the adjacent shover arms forces laterally the next nut in the base of the chutes, forcing out of place the nuts just tapped and forcing into proper position another set of nuts to be tapped. The nuts as they are forced off from the tracks drop into a run-way $A^3$ therebeneath.

N represents the chucks to hold the taps. These chucks are formed upon the inner ends of the spindles D', E', G', $D^3$, $E^3$ and $G^3$. Said spindles are each constructed with a longitudinal channel "$d$," in which the tap is located. The taps are each formed with depressions upon the four sides of each, as shown. The taps are held in place by means of four sliding jaws "$n^3$," "$n^4$," "$n^5$," "$n^6$," which play through corresponding openings on four sides of the head N' of the spindle as at "$n^7$," "$n^8$," "$n^9$," "$n^{10}$," and having tapering ends at their outer extremities, which are engaged by the tapering surface upon the inside of a surrounding cap N', having a screw threaded engagement upon the adjacent end of the spindle, and grip the four depressions in the taps, Fig. 6. As so constructed and arranged a long tap may be employed extending, when new, the whole length of the spindle, which may be used until it is worn out, affording thus a tap which will be more durable and permanent than has been the case with devices as heretofore constructed.

$J^2$ in Fig. 1 is the supporting frame of the table J and the oil tank therebeneath, the tank traveling with the table. $J^3$ is a web engaged with the base of the frame, with which the feed screw shaft is engaged to shift the motion of the table on which the nuts are carried.

While I do not limit myself to my particular belt shifting device, the device shown consists of a shifter bar I' engaged with the belt $I^2$ as by an arm $I^3$. This shifter bar is provided with bosses "$i$" and "$i'$" spaced a desired distance apart.

$I^4$ is a rock shaft upon which are engaged weighted oscillatory arms $I^5$ and $I^6$ and a finger "$i^2$," arranged to strike against the bosses "$i$" and "$i'$" alternately as the shaft $I^4$ is rocked.

Movable with the tank K is a rod or bar K' provided with bosses $K^2$, $K^3$ arranged to bear against the adjacent weighted arm and carry it along. When the corresponding weighted arm has been carried over past the center of gravity, it will drop, causing the finger "$i^2$" to strike against the corresponding boss on the shifter rod throwing it forward in the direction the weighted arms have been moving, thereby shifting the belt and causing the table J to move in the opposite direction.

The operation of the device will readily be understood. As the table J advances in one direction it carries one set of nuts to the adjacent rotating taps until the operation of tapping that set of nuts is completed. The belt shifting mechanism is adjusted to shift the belt at just that stage of affairs, reversing the motion of the first set of taps and also retracting the movement of the table, thereby carrying the second set of nuts to the taps at the opposite end of the machine. It is obvious that no power or time is lost in this operation, as the power and time required to reverse the movement of the table J are utilized to tap a second set of nuts.

In the drawings I have shown three sets of taps at each end of the machine arranged to tap a series of three nuts simultaneously. I do not, however, limit myself to this particular number, as my invention contemplates the employment of one or more taps at each end of the machine, whereby the operation of tapping may be effected at each end alternately as the table J advances and retracts.

The capacity of the machine may be either increased or diminished on the same principle, without departing from the scope of my invention.

The shover bars M and M' are provided each with a set screw V to limit the movement of the corresponding bar. The feed screw shaft H is provided with a friction pulley H³, arranged to slide on the shaft when the set screw of either of said bars strikes against the adjacent portion of the arm J². It will be understood that the bars M and M' advance alternately, and that when one of said bars advances the other bar retracts, giving opportunity for another nut to drop into position in front of the shover arms upon said bar.

What I claim as my invention is—

1. In a nut tapping machine, the combination of a supporting frame, a reciprocatory table located intermediate the ends of said frame and longitudinally movable thereupon, and rotatable taps located upon opposite sides of said table, said table provided on the two sides thereof adjacent to said taps with means for holding the nuts, and whereby the nuts are carried alternately to the rotatable taps on the opposite sides of said table, substantially as described.

2. The combination of a supporting frame, a reciprocatory table to hold the work and a rotatable tap located on opposite sides of the table, and mechanism to cause the table alternately to carry the work to the tap on the one side thereof as the table advances thereto, and to the tap on the other side as the table reverses its movement, substantially as described.

3. In a nut tapping machine, the combination of a supporting frame provided with a track intermediate its ends, a table located upon said track and longitudinally movable thereupon, rotatable taps located upon opposite sides of said table upon the opposite ends of said frame, and means to reverse the movement of the table, said table provided on the two sides thereof adjacent to said taps, with means for holding the nuts, and whereby the nuts are carried alternately to the rotatable taps on the opposite sides of said table, substantially as described.

4. In a nut tapping machine, the combination of a supporting frame, a reciprocatory table located intermediate the ends of said frame and longitudinally movable thereupon, a series of simultaneously rotatable taps located on one side of said table, and a series of simultaneously rotatable taps located upon the opposite side of the table, said table provided on the two sides thereof adjacent to said taps with means for holding the nuts, and whereby the nuts are carried alternately to the rotatable taps, substantially as described.

5. In combination a supporting frame, a reciprocatory table to hold the work, an oil tank movable with the table, and rotatable taps located on opposite sides of said table, substantially as described.

6. In a nut tapping machine, the combination of a supporting frame, a reciprocatory table located intermediate the ends of said frame and longitudinally movable thereupon, and rotatable taps located on opposite sides of the table upon the ends of said frame, said table provided with means to carry the nuts to the taps on each side of the table, and with feeding chutes leading down on opposite sides of the table, substantially as described.

7. In combination a supporting table, a reciprocatory table provided with chutes to carry the work, rotatable taps located on opposite sides of the table, and shovers to move forward the work into position for the taps, substantially as described.

8. In combination a supporting frame, a reciprocatory table constructed with chutes to carry the work, rotatable taps located on opposite sides of the table, said chutes provided at their bases with laterally projected tracks for supporting the work in position for the taps, and means to move the work forward on said tracks into position for the taps, substantially as described.

9. In combination a supporting frame, a reciprocatory table, an oil tank movable with said table, rotatable taps located on opposite sides of said table, said tank provided with spigots to discharge oil upon the work, substantially as described.

10. In a nut tapping machine, the combination of a supporting frame, a reciprocatory table located intermediate the ends of the frame, a series of rotatable taps located on each side of said table, driving pulleys geared with both series of said taps and with said table, and a belt shifting device, said table provided with means located on opposite sides thereof adjacent to said taps, to carry the nuts, and whereby the nuts may be carried alternately to each of said series of taps, substantially as described.

11. In a nut tapping machine, the combination of a supporting frame, a reciprocatory table located intermediate the ends of the frame, a feed screw shaft to reciprocate said table, a series of rotatable taps located on each end of the frame on opposite sides of the table, and reversible driving mechanism, substantially as described.

12. In combination a supporting frame, rotatable taps, a reciprocatory table to carry the work to the taps, shovers to move forward the work to the taps, and a reversible feed screw to operate said table and shovers, substantially as described.

13. In combination a supporting frame, a reciprocatory table, rotatable taps, shover bars provided with shover arms to move forward the work to the taps, a feed screw to operate said table, and a shaft L' provided with a lever L geared with the feed screw to operate said shover bars, substantially as described.

In testimony whereof I sign this specification in the presence of two witnesses.

EDWARD THOMAS GILBERT.

Witnesses:
N. S. WRIGHT,
JOHN F. MILLER.